United States Patent [19]

Hudson

[11] Patent Number: 4,961,280
[45] Date of Patent: Oct. 9, 1990

[54] LIVE BAIT PROTECTOR AND HOOK APPARATUS

[76] Inventor: Donald Hudson, 6402 Darlinghurst, Houston, Tex. 77085

[21] Appl. No.: 306,476

[22] Filed: Feb. 6, 1989

[51] Int. Cl.⁵ .................. A01K 97/04; A01K 97/02
[52] U.S. Cl. ................................. 43/44.99; 43/41
[58] Field of Search .............. 43/41, 42.06, 44.99, 43/44.2, 44.4, 44.8

[56] References Cited

U.S. PATENT DOCUMENTS

| | | | |
|---|---|---|---|
| 556,494 | 3/1896 | Dales | 43/41 |
| 862,150 | 8/1907 | Fredricks | 43/41 |
| 933,818 | 9/1909 | Beatty | 43/41 |
| 2,556,634 | 6/1951 | Redinger | 43/41 |
| 2,697,295 | 12/1954 | Hinds | 43/44.8 |
| 2,780,021 | 2/1957 | Fagg | 43/44.99 |
| 2,828,571 | 4/1958 | Caplan | 43/41 |
| 2,994,983 | 8/1961 | Best | 43/41 |
| 3,273,277 | 9/1966 | Valentine | 43/41 |
| 3,688,430 | 9/1972 | Balch | 43/42.06 |
| 4,788,788 | 12/1988 | Brockett | 43/44.2 |

Primary Examiner—Kurt Rowan
Attorney, Agent, or Firm—Kenneth D. Baugh

[57] ABSTRACT

A live bait protector and hook apparatus 10 is provided. The live bait protector and hook apparatus 10 includes a fishing hook 12 and a line 14 coupled to the hook. A transparent member 26 is provided to surround and encase the hook 12 and bait 50. A sealing member 38 is provided to seal the transparent member 26 so that the bait 50 can be protected from unwanted tampering while in the water.

20 Claims, 3 Drawing Sheets

LIVE BAIT PROTECTOR AND HOOK APPARATUS

TECHNICAL FIELD

This invention relates to a fishing implement and more particularly to a Bait Protector and hook apparatus for protecting live or natural bait while fishing. The need to protect fishing bait from premature elimination while fishing is an ongoing concern. The popularity of fishing as a sport and recreational endeavor and the attendant cost of bait contributes to this on going concern. The key to addressing this concern is to increase the longivity of the bait on the hook. There have been a number of different developments to provide bait which will last and not be taken or nibbled away prematurely before the catch. For the most part these developments have been directed at artificial bait. There are many different arrangements of artificial bait. Although the artificial bait will endure longer and not likely be nibbled away it is not as attractive as live or natural bait.

Because of the need to provide the best bait available and increase fishing effeciency live bait is preferred. Accordingly, a simple and in expensive apparatus is desirable that will protect live bait during fishing until a catch is secured. That is, an appatatus is needed which will afford natural bait with the durability of artificial bait while still maintaining the attractiveness of natural bait.

BACKGROUND OF THE ART

Attempts have been made to provide devices that will secure and protect live bait so that it will survive in the water until a catch is secured. One such device is disclosed in U.S. Pat. No. 4,229,901. This device is a fishing hook 15 apparatus which is equipped with a holder for the bait. The device includes a hook which cooperates with a gridling loop harness to hold the bait and thereby secure it on the hook. Another arrangement is disclosed in U.S. Pat. No. 4,471,558. This device includes a combined fishhook and live bait holder. This arrangement includes an elastic strap secured to the hook to facilitate the securing of the bait on the hook.

Both these arrangements have realized some success. However these devices still do not address the problem. The problem occurs when fish and other predators nibble the bait off the hook until no bait is left to atract a catch. There remains a need for a device which will protect the live or natural bait until a catch has been secured.

DISCLOSURE OF THE INVENTION

A live bait protector and hook apparatus is provided for protecting live bait while in the water during fishing. The live bait protector and hook apparatus includes a fishing hook for holding live bait on a lower portion thereof and a fishing line coupled to an upper portion of the hook. A transparent means is provided for surrounding and encasing the hook and for facilatating the transfer of odor from the bait into the water. The transparent means is slidably coupled to the line. The live bait protector and hook apparatus also includes a means for sealing the transparent means. As a result the hook and bait in the transparent means can be protected from unwanted tampering.

BRIEF DESCRIPTION OF THE DRAWINGS

The details of the invention will be described in connection with the accompanying drawing in which.

BEST MODE FOR CARRYING OUT THE INVENTION

Figure 1:
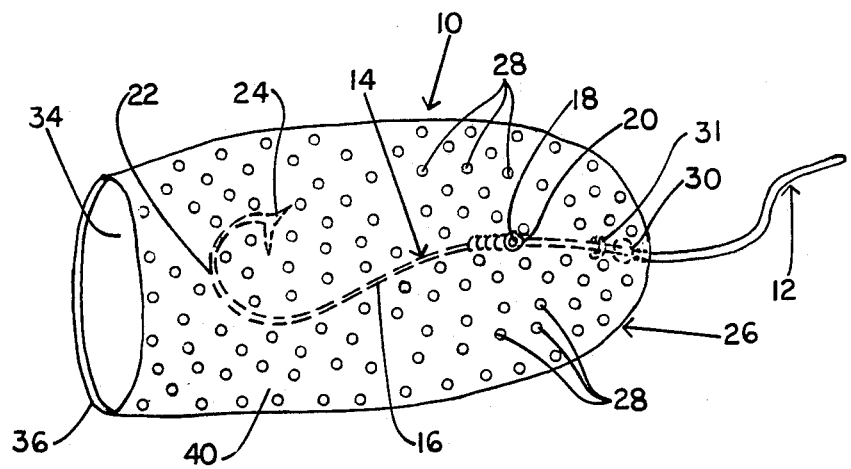
FIG. 1 is a perspective view illustrating a live bait protector and hook apparatus in accordance with the principles of this invention.

Referring to FIG. 1 there is shown, a live bait protector and hook apparatus generally designated by the numeral, 10. The hook apparatus 10 includes a nylon fishing line, generally designated by the numeral, 12. The line 12 is provided for coupling to a hook, generally designated by the numeral, 14. The hook 14 is formed with a shank 16 which has an opening 18 formed therethrough at an upper portion 20 thereof. The line 12 is fed through the opening 18 in shank 16 to allow the line to be tied and secured to the hook 14. The hook 14 is also provided with a curved lower portion 22 that terminates in a barbed point 24.

A pouch, generally designated by the numeral, 26 is provided to protect the hook 14 and its contents. The pouch 26 is made of a transparent porus plastic or rubber like material having a plurality of openings 28 formed throughout the surface thereof. The pouch may, for example be formed in the shape of the particular bait be used if desired. A small aperture 30 is formed in an upper portion 32 of the pouch 26 and a larger aperture (FIG. 2) 34 is formed in a lower portion 36 of the pouch. The aperture 30 allows the pouch 26 to be slidably mounted on the line 12 and positioned where desired. A stop 31 can be provided to keep the pouch 26 in a desired predetermined position on the line. The pouch 26 is also provided with a coupling or sealing member, generally designated by the numeral, 38. The coupling member 38 allows the pouch to be opened and securely closed as required. The coupling member 38 may include, for example, a ridge or abutment, generally designated by the numeral, 42 which extends along one side 44 of an outer periphery of the opening 34. The coupling member 42 is also provided with a channel 46. The channel 46 is coupled to extend along the other side 48 of the outer periphery of the opening 34 in alignment with the ridge 42. The ridge 42 is slightly larger in dimensions than the channel 46. As a result the ridge 42 when pushed into the channel will be held securely therein thus sealing the pouch 26 closed.

Figure 2:
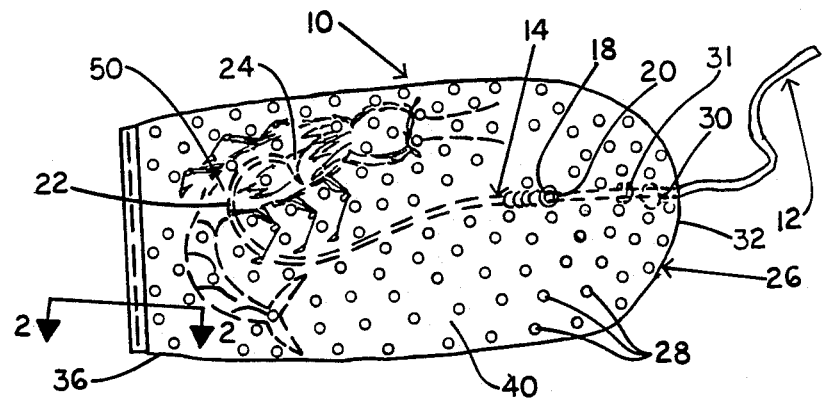
FIG. 2 is another perspective view illustrating the live bait protector and hook apparatus of FIG. 1.
Figure 3:
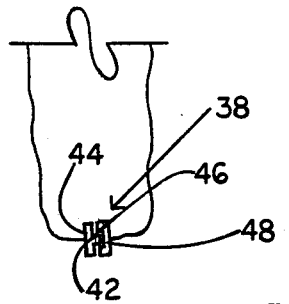
FIG. 3 is a cross sectional view of the live bait protector and hook apparatus taken along lines 3—3 of FIG. 2.

As illustrated in FIG. 2 when the live bait protector and hook apparatus 10 is in use live bait such as, for example, a shrimp 50 is placed on the hook 14. The hook 14 and bait 50 are then secured in the pouch 26. Of course the coupling member 38 is engaged by inserting the ridge 42 thereof into the channel 46. Because of the openings 28 in the pouch 26 fish can still smell the bait 50 just as if the bait were not in the pouch. The fish being able to smell the live bait 50, of course, enhances the chance of a catch. However, because the pouch 26 is a protective cover over the hook 14 and bait 50 these same fish or other predators cannot tamper with the bait. Thus once the live bait 50 is on the hook 14 and sealed in the pouch the fishing operation can begin without danger of the bait being tampered with.

Figure 4:
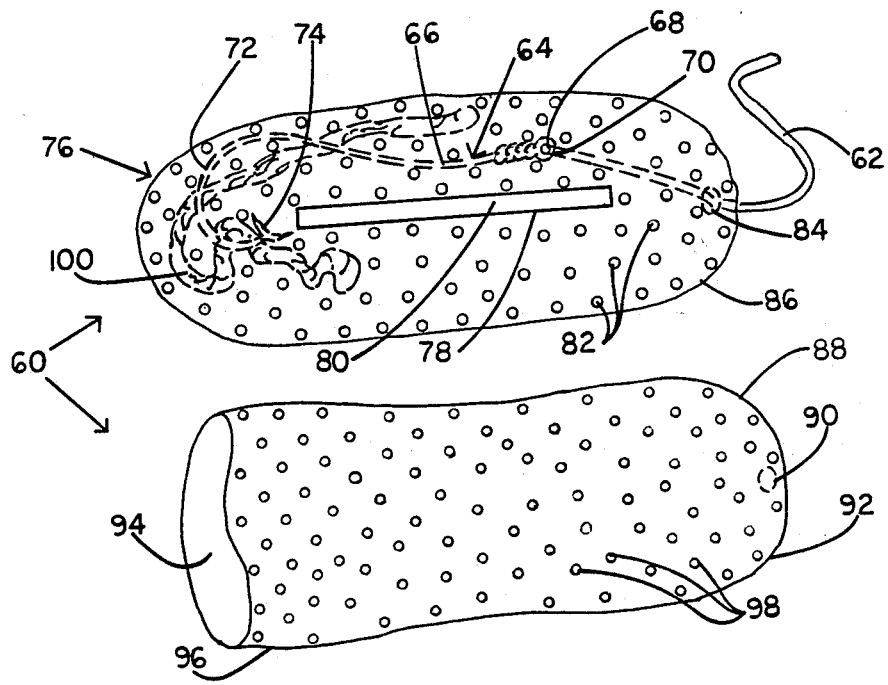
FIG. 4 is a perspective view of a second embodiment of a live bait protector and hook apparatus in accordance with the principles of this invention.

A second embodiment of the live bait protector and hook apparatus, generally designated by the numeral 60, is illustrated in FIG. 4. The hook apparatus 60 includes a fishing line 62. The line 62 is coupled to a hook, generally designated by the numeral 64. The hook 64 includes a shank 66 having an opening 68 formed in an upper end 70 thereof. The line 62 is fed through the opening 68 in the shank 66 so that the line can be tied to the hook. The hook 14 is also provided with a curved lower portion 72 which terminates in a barbed point 74.

The live bait protector and hook apparatus 60 is provided with a pouch, generally designated by the numeral, 76. The pouch 76 includes a longitudinally extending slit 78. The slit permits access to internal portions 80 of the pouch. The pouch 76, like the pouch 26, is made of a transparent porus plastic or rubber like material. The pouch includes a plurality of openings 82 formed throughout its surface. The pouch 76 also includes an opening 84 formed in an upper portion 86 thereof which permits the line 62 to be fed into the pouch.

Figure 5:
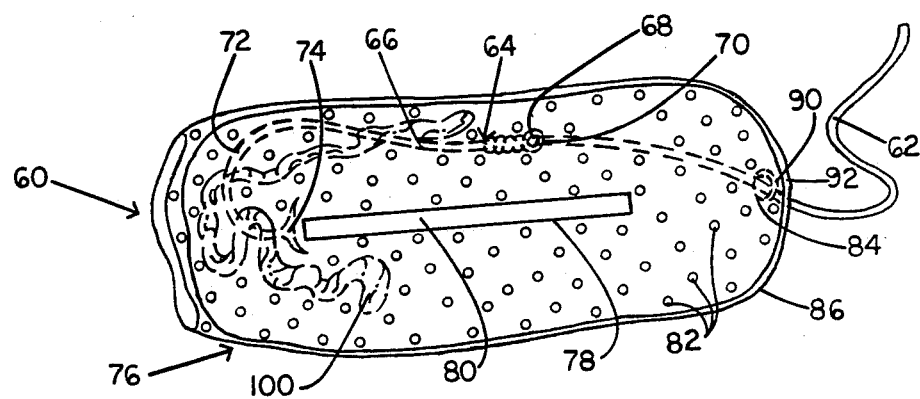
FIG. 5 is another perspective view of the second embodiment of the live bait protector and hook apparatus of FIG. 4.

A sock or cover, generally designated by the numeral, 88 is provided to be pulled over the pouch 76. The sock 88 is formed with a small opening 90 in an upper portion 92 thereof and a larger opening 94 in a lower position 96 thereof. The sock 88 is made of a transparent porus plastic or rubber like material. A plurality of openings 98 are formed throughout the surface of the sock 88. The dimensions of the sock 88 are slightly smaller than the dimensions of the pouch 76. As a result when the sock 88 is pulled over the pouch as illustrated in FIG. 5 the sock will tightly cling to the pouch thereby sealing the same. Thus the contents of the pouch 76 including the live bait, such as, for example, a worm 100 are protected from external influences.

Figure 6:
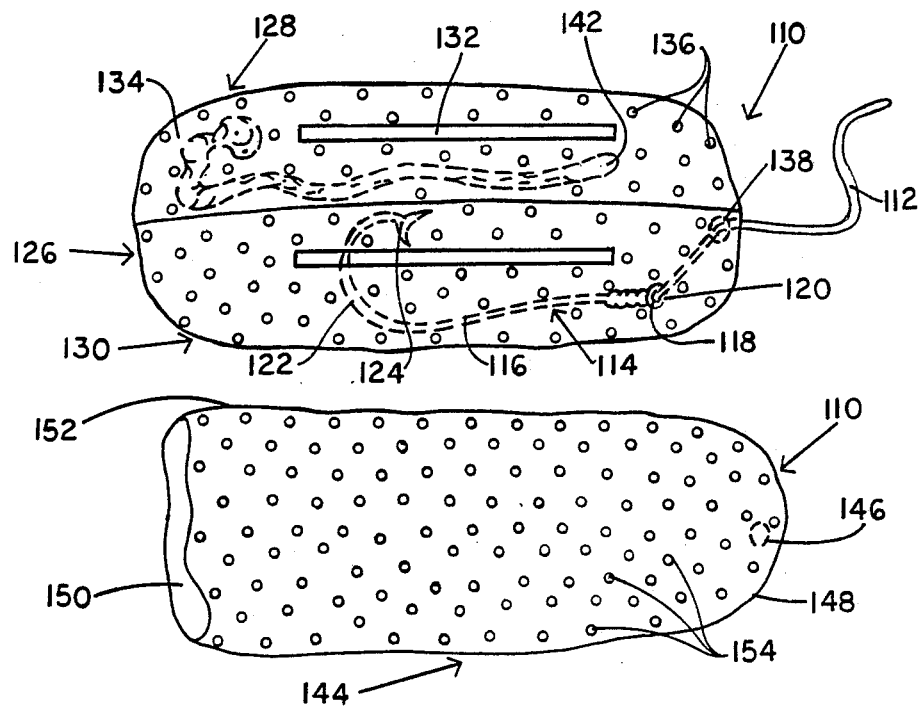
FIG. 6 is a third embodiment of a live bait protector and hook apparatus in accordance with the principles of this invention.

A third embodiment of the Live Bait protector and hook apparatus, generally designated by the numeral, 110 is illustrated in FIG. 6. The hook apparatus 110 includes a fishing line 112. The line 112 is coupled to a hook generally designated by the numeral, 114. The hook 114 includes a shank member 116 having an opening 118 formed in an upper end 120 thereof. The line 112 is fed through the opening 118 in shank member 116 to allow the line to be tied to the hook. The hook 114 is also provided with a curved lower portion 122 which terminates in a barbed point 124.

The third embodiment of the live bait protector and hook apparatus 110 is provided with a pouch, generally designated by the numeral, 126. The pouch 126 is provided with two adjacently aligned compartments, generally designated the numerals, 128 and 130 respectively. Each compartment 128 and 130 is provided with a longitudinally extending slit 132 which permits access to internal portions 134 of each compartment. The pouch 126 is made of a transparent porus plastic or rubber like material having a plurality of openings 136 formed throughout its surface.

The compartment 130 of the pouch 126 also includes an opening 138 formed in an upper portion 140 thereof. The opening 138 allows the line 112 to be fed into the compartment 130. As illustrated in FIG. 6 the compartment 130 is provided to house the hook 114 and portions of the live bait 112. The compartment 128 is provided to house live bait, such as, for example, a worm 142.

Figure 7:
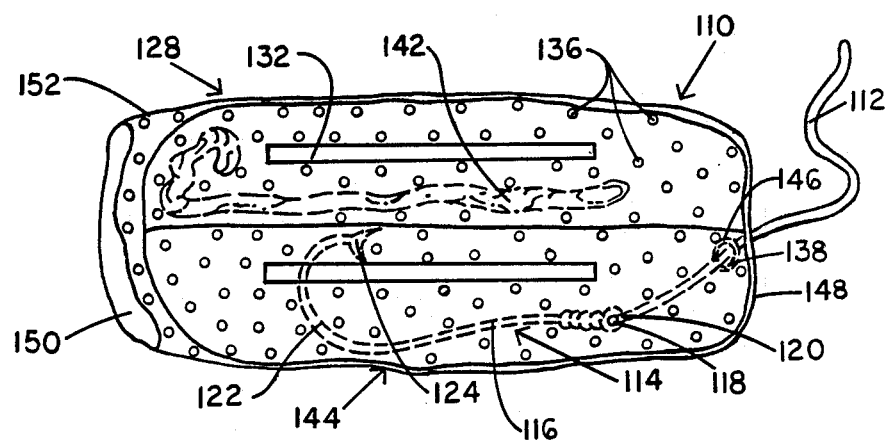
FIG. 7 is another perspective view of the third embodiment of the live bait protector and hook apparatus of FIG. 6.

A sock or cover, generally designated by the numeral, 144 is provided to be pulled over the pouch 126 to and secure the contents of the pouch. The sock 144 is formed with a small opening 146 in an upper portion 148 thereof. A larger opening 150 is formed in a lower portion 152 of the sock 144. The sock 144 is also made of a transparent porus plastic or rubber like material having a plurality of openings 154 formed therein. The dimensions of the sock 144 are slightly smaller than those of the pouch 126. As a result when the sock 144 is pulled over the pouch 126 as illustrated in FIG. 7, the sock tightly clings to the pouch so that the contents of the pouch including the live bait, such as a worm 142 are securely locked therein.

It should be understood that the particular live or natural bait disclosed herein is for illustration purposes only and any number of different types of live or natural bait can be used without departing from the scope of the invention. Simularly different configurations of hooks can be used without departing from the scope of the invention.

It should be further understood that various changes and notifications can be made without departing from the spirit of the invention as defined in the claims.

What is claimed:

1. A live bait protector and hook apparatus for protecting bait while in the water including:
    a fishing hook for engaging and holding bait on a lower portion thereof;
    a fishing line coupled to an upper portion of the fishing hook;
    transparent means slidably coupled to the line for surrounding the encasing the entire hook and for facilitating the transfer of odor from the bait into the water; and
    means for sealing the transparent means so that the bait and entire hook are sealed in the transparent means and protected from unwanted tampering.

2. A live bait protector and hook apparatus as defined in claim 1 wherein the transparent means includes a pouch having a small aperture formed in an upper portion thereof and a large aperture formed in a lower portion thereof.

3. A live bait protector and hook apparatus as defined in claim 2 wherein the pouch includes a plurality of apertures formed throughout the surface thereof.

4. A live bait protector and hook apparatus as defined in claim 3 wherein the pouch is made of a transparent porus plastic or rubber like material.

5. A live bait protector and hook apparatus as defined in claim 4 wherein the fishing line is fed into the pouch through the small aperture and coupled to the hook so that the pouch is slidably coupled on the line.

6. A live bait protector and hook apparatus for protecting bait while in the water including:
    a fishing hook for engaging and holding bait on a lower portion thereof;

a fishing line coupled to an upper portion of the fishing hook;

a pouch having a plurality of apertures formed through the surface thereof, a small aperture formed in an upper portion thereof and a large aperture formed in a lower portion thereof, the fishing line being fed into the pouch through the small aperture and coupled to he hook so that the pouch is slidably coupled on the line;

a ridge which extends along one side of an outer periphery of the larger opening in the pouch; and a channel formed in and extending along the other side of the outer periphery of the larger opening in the pouch, the dimensions of the ridge being slightly larger than the dimensions of the the channel, so that when the ridge is pushed into channel the ridge will be locked therein thereby sealing the pouch closed.

7. A live bait protector and hook apparatus for protecting bait while in the water including:

a fishing hook for engaging and holding bait on a lower portion thereof;

a fishing line coupled to an upper portion of the fishing hook;

a first transparent means slidably coupled to the line for surrounding and encasing the hook and for facilatating the transfer of odor from the bait into the water; and a second transparent means for surrounding and covering the first transparent means so that the first transparent means is sealed and the bait and hook are protected from unwanted tampering.

8. A live bait protector and hook apparatus as defined in claim 7 wherein the first transparent means includes a pouch having a small aperture formed in an upper portion thereof and a longitudinally extending slit formed on an intermediate portion thereof.

9. A live bait protector and hook apparatus as defined in claim 8 wherein the pouch includes a plurality of apertures formed throughout the surface thereof.

10. A live bait protector and hook apparatus as defined in claim 9 wherein the pouch is made of a transparent porus plastic or rubber-like material.

11. A live bait protector and hook apparatus as defined in claim 10 wherein the fishing line is fed into the pouch through the small aperture and coupled to the hook so that the pouch is slidably coupled on the line.

12. A live bait protector and hook apparatus as defined in claim 11 wherein the second transparent means is a transparent porus plastic or rubber like material having a purality of openings formed therein, the second transparent means having dimensions slightly smaller than the dimensions of the pouch so that when the second transparent means is pulled over the pouch the second transparent means will tightly cling to the pouch thereby sealing the pouch closed.

13. A live bait protector and hook apparatus for protecting bait while in the water including:

a fishing hook;

a fishing line coupled to an upper portion of the fishing hook;

a first transparent means slidably coupled to the line for surrounding and encasing the hook and bait and for facilatating the transfer of odor from the bait into the water; and a second transparent means for surrounding and covering the first transparent means so that the first transparent means is sealed and the bait and hook are protected from unwanted tampering.

14. A live bait protector and hook apparatus as defined in claim 13 wherein the first transparent means includes a pouch formed with a pair of adjacently aligned compartments, the first of the pair of compartments being provided to house the bait and the second of the pair of compartments being provided to house the hook.

15. A live bait protector and hook apparatus as defined in claim 14 wherein the second of the pair of compartments of the pouch includes a small aperture formed in an upper portion thereof and each of the pair of compartments includes a longitudinaly extending slit formed on an intermediate portion thereof.

16. A live bait protector and hook apparatus as defined in claim 15 wherein the pouch includes a plurality of apertures formed throughout the surface thereof.

17. A live bait protector and hook apparatus as defined in claim 16 wherein the pouch is made of a transparent porus plastic or rubber-like material.

18. A live bait protector and hook apparatus and defined in claim 17 wherein the fishing line is fed into the pouch through the small aperture in one of the compartments and coupled to the hook so that the pouch is slidably coupled on the line.

19. A live bait protector and hook apparatus as defined in claim 18 wherein the second transparent means is a transparent porus plastic or rubber-like material having a purality of openings formed therein, the second transparent means having dimensions slightly smaller than the dimensions of the pouch so that when the second transparent means is pulled over the pouch the second transparent means will tightly cling to the pouch thereby sealing the pouch closed.

20. A live bait protector and hook apparatus as defined in claim 6 wherein the pouch is made of a transparent porous plastic or rubber like material.

* * * * *